2,800,425

ARSENOSOBENZENE POULTRY TREATMENT COMPOSITION

James T. Smith, Omaha, Nebr., assignor to Geo. H. Lee Co., Omaha, Nebr., a corporation of Nebraska No Drawing. Application December 16, 1953, Serial No. 398,645

12 Claims. (Cl. 167—53.1)

The present invention relates to the art of veterinary medicine and is concerned with a new and useful means for the control and prevention of coccidiosis in poultry. In particular, this invention concerns new specific preventives for this poultry disease. One form of the disease in chickens, the bloody or cecal type, is caused by the coccidium, Eimeria tenella. This species of coccidia is known to cause extensive weight loss and sometimes extensive death loss among chickens. Therefore, in the poultry industry, preventives for coccidiosis are of major importance in order to insure the normal growth and development of poultry.

Many coccidiostatic drugs have been developed and are in use today, but they have definite disadvantages associated with them. The sulfonamides are effective when given in high dosages but such dosage levels can only be continued for short periods of time. The same is true for the prior art pentavalent arsenicals such as 3-nitro-4-hydroxy phenylarsonic acid and arsanilic acid. The lowest effective feed dosage claimed for any of the presently used coccidiostatic compounds is 0.0055% (55 parts per million) for nitrofurazone.

Therefore, an object of this invention is to provide a medicated composition whereby the effective dosage given to poultry may be lower than the necessary dosages of presently employed drugs while at the same time the improved remedy will still combat coccidiosis. A further object of the instant invention is the discovery and use of a medicated composition that may be administered for extensive periods of time with the absence of toxic effects on poultry so treated.

Another object of this invention is to provide a medicated composition that can be easily administered, preferably orally to poultry, e. g., by addition to the feed or to the water. Another object is the employment of a medicated composition that not only prevents coccidiosis in poultry but is also beneficial to the general growth and development of poultry, especially when administered over an extensive period of time.

It has been discovered that these objects are accomplished by the employment of arsenosobenzene, a tervalent arsenical also known as phenyl arsenoxide and having the formula of

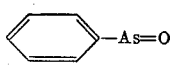

This arsenical may be used to effectively control coccidiosis in poultry in concentrations that are less than those currently used while at the same time this compound will additionally be beneficial to the general growth and development of the poultry thus treated. This compound can be easily incorporated in the mash or in the water and thereby is easily and directly administered without undue difficulty. The effective dosages of arsenosobenzene that are employed do not cause any toxic harmful effects in the treated poultry and therefore the treatment may be used over a far more extensive period of time than arsenicals currently used for prevention of coccidiosis.

While the parent compound, arsenosobenzene, has been found superior to some of its derivatives in successfully combatting and preventing coccidiosis in poultry when administered in dosages less than dosages employed by the prior art using pentavalent arsenic compounds, still certain of the derivatives of arsenosobenzene can be successfully employed to combat the disease. Thus in Example III, 4-nitro arsenosobenzene and alkyl substituted arsenosobenzenes, more particularly lower alkyl substituted arsenosobenzenes such as 2-methyl arsenosobenzene, and 4-methyl arsenosobenzene are so used. It is again pointed out that while the derivatives of arsenosobenzene may be employed that the results obtained with the parent compound are better than those obtained with some of its derivatives.

It is also obvious from prior art that arsenosobenzene and its derivatives under proper conditions behave as acids, and the salts formed from these acids have the same therapeutic activity as the neutral compounds. The oxygen atom of the arsenoso group is also easily replaceable with two halogen atoms, and these halogenated forms also have the same therapeutic activity as the parent substances when suitably diluted for oral administration. In such compounds the activity of the tervalent arsenic is unchanged, and the use of them is tantamount to the use of the arsenosobenzene.

The following three examples serve to illustrate the invention wherein arsenosobenzenes are used in poultry mash for the purpose of preventing coccidiosis.

Example I

This test was conducted for the purpose of testing the effectiveness of arsenosobenzene in a concentration of 0.0025% (25 p. p. m.) for the treatment of coccidiosis. Eighty New Hampshire Reds, about four weeks of age were divided into four groups for the purpose of this experiment. Group I was treated as the control group and was fed a growing mash ad libitum. This control group was given no arsenosobenzene and was given no inoculations of Eimeria tenella. Group II was inoculated with 100,000 sporulated oocysts of Eimeria tenella. This group was given no medication. Group III was given only 0.0025% arsenosobenzene in their mash. Group IV was given both 0.0025% arsenosobenzene and 100,000 sporulated oocysts of Eimeria tenella. The groups receiving the arsenosobenzene received this material continuously during the test. The two groups receiving the oocysts were inoculated three days subsequent to the inception of the administration of the arsenosobenzene. All groups progressed normally for about one week from the beginning of the tests when extensive hemorrhaging was noticed in group II as a result of the disease. The results of this experiment are summarized:

The control group I showed a weight gain of about 75% during the first eleven days of the test. Group II which was only inoculated with the oocysts showed a weight gain of about 25% and a death loss of seven birds. Group III wherein the birds were fed medicated mash, showed a weight gain of 73% in the same period of time. Group IV which was inoculated with oocysts and treated with arsenosobenzene showed no deaths and a weight gain of about 71% in the same period of time.

The birds in groups II and IV were killed for cecal examination after eleven days while the birds in groups I and III were observed for a further period of six days, the birds in group III being kept on medicated mash during this further period also. At the end of that time the weight of the birds in group III was the same as the weight of the birds in group I. The autopsy of the birds of group II revealed no normal ceca, 6 small plugs, 7 medium plugs and 27 large plugs (the ceca engorged with blood of the birds that died before the end of the eleventh day were recorded as large plugs) while the autopsy of the birds of group IV revealed 31 normal ceca and 9 small plugs.

The conclusions that can be drawn from this experiment are two fold. First, a concentration of arsenosobenzene of 0.0025% gave excellent control of coccidiosis. Second, this concentration did not harm the birds even though it was fed continuously for seventeen days.

*Example II*

In this experiment 92 straight run White Rock chickens were used. Group I received 0.00125% (12½ p. p. m.) arsenosobenzene in the mash throughout the test which extended for two months. Group IV throughout the test was fed 0.0025% (25 p. p. m.) arsenosobenzene (twice as much as group I) for the same length of time as group I. The arsenosobenzene was added to the mash by mixing 22.5 grams of a 5% arsenosobenzene composition with 430 grams of pulverized whole corn. 22.5 grams of this premix were added to 10 lbs. of mash in order to prepare a concentration of 0.00125% and fed to group I. 45 grams of this premix were added to 10 lbs. of mash in order to get a concentration of 0.0025% and fed to group IV. An 18% protein chick starter mash was fed to both groups. The other two groups, namely, groups II and III, were fed throughout the experiment the same mash but no arsenosobenzene was included. Six weeks after the start of the experiment a total of 1,500,000 sporulated oocysts of *Eimeria tenella* were given to groups I, II, and IV. Group III was the control group wherein no medication and no oocysts were given. The inoculations were given in the mash in three dosages of 500,000 oocysts at a time, at intervals of 2 days. The experiment was concluded approximately two weeks after the inoculations when groups I, II and IV were weighed and killed for examination. Group I wherein 0.00125% arsenosobenzene and 1,500,000 oocysts were administered showed a gain of 5% in weight over the weight gained by the controls. All birds in this group survived. In group II wherein no medication was administered and 1,500,000 oocysts were administered there was a weight gain that amounted to 26% less than the controls. In this group 10 birds died. There was generally no sign of recovery for the remainder of the birds in this group at the time when they were killed for post mortem examination. The control group III grew normally and there were no deaths. Group IV which was fed a 0.0025% arsenosobenzene and was inoculated with 1½ million oocysts showed at the end of the tests a weight gain of 4% more than the controls. There were no deaths in this group.

The autopsy of the birds of group I revealed 42 normal ceca, 2 small plugs and 2 medium plugs. The autopsy of the birds of group II revealed 4 normal ceca, 3 small plugs, 8 medium plugs and 31 large plugs. The autopsy of the birds of group IV revealed 44 normal ceca and 2 small plugs.

The conclusions of this test show that the effectiveness of 0.00125% arsenosobenzene is substantially equivalent to that of the more concentrated dose of 0.0025% arsenosobenzene on a continuous feeding program. The conclusions also show that arsenosobenzene has a beneficial effect on the growth of the poultry as evidenced by the weight gains which were greater than the controls. There were no toxic effects noted because of the length of exposure to arsenosobenzene in either concentration.

*Example III*

In tests similar to Example I, each one of the following compounds, 4-nitro arsenosobenzene, 2-methyl arsenosobenzene, and 4-methyl arsenosobenzene protected against death loss and excessive bleeding at dosages from .002% to .003% in the mash when susceptible chicks were given massive doses of sporulated oocysts. In similar experiments with the arsenosobenzene offered in the drinking water, the dosage is lower than expected from the amount required in the mash. Over extended periods of use as in Example II, effective dosage is as low as .0005%.

The above examples clearly show the new and unexpected results that have been obtained by treating poultry with arsenosobenzene or some of its derivatives. Effective doses incorporating a concentration as low as 0.00125% in the feed and 0.005% in drinking water successfully prevents coccidiosis from harming poultry. Continuous administration of these medicinals for as long a period of time as 2 months does not induce any toxic effects in the poultry. On the contrary, beneficial effects such as increased weight are frequently noted when the treated birds are compared weth the untreated birds. The continuous use of a dosage of 0.0025% although twice the concentration of 0.00125% dosage does not harm the birds, and to the contrary, this higher concentration is also beneficial over the length of time that it is fed to the poultry. All three of these important results, namely, successful control of disease with low concentrations, continuous successful use of the medicated compositions with no toxic effects and the beneficial growth effects are obtained with the same effective dosage.

Arsenosobenzene may be employed in concentrations both larger and smaller than the concentrations employed in the above examples. For instance, although concentrations of 0.00125% and 0.0025% are preferred for continuous use, concentrations as low as 0.0005% have been found to be beneficial to poultry. Concentrations up to 0.01% may also be used in part of the diet although a concentration of 0.01% cannot be used in the whole diet because of toxic effects. The examples demonstrate this high concentration to be unnecessary in that success was obtained with lower concentrations for continuous use and effective control of coccidiosis.

Arsenosobenzene and its derivatives can be introduced into the mash simply as a fine powder provided the proper precautions are used for forming an intimate mix. Generally speaking, these precautions are elaborate because of the small proportion of toxic powder employed. A further manner of preparing the medicinal for use is by dissolving arsenosobenzene in a caustic aqueous solution which procedure is quite desirable. This latter procedure is illustrated by the production of a 5% powder of the active medicinal in accordance with the following example:

To 50 grams of arsenosobenzene is added a hot (90° C.) mixture of 50 ml. of 40% aqueous solution of sodium hydroxide and 85 ml. of water. The arsenosobenzene is dissolved with stirring and more heat is added if necessary. This solution is added to about 700 grams of an inert powder such as calcium sulfate or a suitable form of silicon dioxide for example, tripoli or diatomaceous earth, or an insoluble silicate for example, talcum, kaolin and other clays. As a result of the treatment of arsenosobenzene with the caustic solution it is now in the form of sodium phenyl arsenite. This is converted to arsenosobenzene by the addition of sulfuric acid or phosphoric acid in an amount equivalent to the amount of sodium hydroxide employed above. Preferably 85 grams of sodium acid sulfate or 98 grams of monobasic sodium phosphate are used for the conversion since they are convenient to use by adding as a dry powder. Thorough mixing is desired so that the complete conversion to arsenosobenzene can be accomplished. The product is then dried by placing it in trays and exposing it to a current of air at room temperature. If desired, mechanical driers may be employed. After such mixing and drying the product so far obtained is made up to 1 kilogram by the addition of an inert substance. Part of this inert material can be iron oxide and part can be mineral oil which is employed to avoid dusting. Any suitable animal or vegetable oil or other harmless substance to control dust can be substituted for the mineral oil. In place of the iron oxide there may be substituted any nontoxic coloring matter. The function of the color is to give a visual indication of the thoroughness of mixing as well as to identify the toxic substance. Any necessary grinding and screening to obtain a fine powder can be done after the final addition of all ingredients. It is obvious that in handling toxic material like arsenosobenzenes, proper protection from fumes and dust must be provided at all stages of processing. A typical composition containing arsenosobenzene prepared according to the above procedure is as follows:

| | Percent |
|---|---|
| Arsenosobenzene | 5 |
| Calcium sulphate | 72 |
| Sodium sulphate | 9 |
| Mineral oil | 9 |
| Iron oxide | 5 |

The method of preparation may vary to the extent of adding a solution of arsenosobenzene in any known volatile organic solvent therefor to the inert carrier such as iron oxide, etc., or even grinding the arsenosobenzene in the cold with an inert diluent such as calcium sulphate or kaolin.

I claim:

1. A composition for administration to poultry comprising a poultry feed and an arsenosobenzene compound selected from the group consisting of arsenosobenzene per se, alkyl arsenosobenzene and nitro arsenosobenzene.

2. A composition for administration to poultry comprising a poultry feed and arsenosobenzene per se.

3. The composition of claim 2, in which the arsenosobenzene per se is used in amounts of about 0.0005 to 0.01%, said composition being effective to prevent coccidiosis.

4. The composition of claim 2, in which the arsenosobenzene per se is used in amount of about 0.00125 to 0.0025%, said composition being effective to prevent coccidiosis.

5. The composition of claim 1, in which the arsenosobenzene has an alkyl substituent.

6. The composition of claim 5, in which the alkyl substituent is a lower alkyl group.

7. The composition of claim 5, in which the alkyl substituent is a methyl group.

8. The composition of claim 1, in which the arsenosobenzene is 2-methyl arsenosobenzene.

9. The composition of claim 8, in which the 2-methyl arsenosobenzene is present in an amount of about 0.00125 to 0.0025%, said composition being effective to prevent coccidiosis.

10. The composition of claim 1, in which the arsenosobenzene is 4-methyl arsenosobenzene.

11. The composition of claim 10, in which the 4-methyl arsenosobenzene is present in an amount of about 0.00125 to 0.0025%, said composition being effective to prevent coccidiosis.

12. The composition of claim 1, in which the arsenosobenzene is 4-nitro arsenosobenzene.

References Cited in the file of this patent

UNITED STATES PATENTS 2,449,080    Mayfield _____ Sept. 14, 1948

OTHER REFERENCES

Eagle et al.: Pharmacological Reviews, vol. 3, 1951, pp. 107–143 (esp. pp. 107, 108, 111, 113, 116, 137 and 138).